(12) United States Patent
Zhang

(10) Patent No.: US 6,904,768 B2
(45) Date of Patent: Jun. 14, 2005

(54) ABSORPTION-TYPE AIR CONDITIONER SYSTEM

(76) Inventor: Yue Zhang, Broad Town, Changsha (CN) 410138

( * ) Notice: Subject to any disclaimer, the term of this patent is extended or adjusted under 35 U.S.C. 154(b) by 61 days.

(21) Appl. No.: 10/835,431

(22) Filed: Apr. 29, 2004

(65) Prior Publication Data

US 2005/0016204 A1    Jan. 27, 2005

(30) Foreign Application Priority Data

Jul. 23, 2003    (CN) .................................. 03124681

(51) Int. Cl.⁷ .......................................... F25B 15/00
(52) U.S. Cl. ........................... 62/476; 62/141; 62/478; 62/497; 165/184
(58) Field of Search .................... 62/141, 476, 478, 62/481, 497; 165/167, 179, 184

(56) References Cited

U.S. PATENT DOCUMENTS 3,247,679 A  *  4/1966  Meckler ..................... 62/271
3,401,530 A  *  9/1968  Meckler ..................... 62/235.1
3,509,732 A  *  5/1970  Roeder, Jr. ................. 62/476
5,131,238 A  *  7/1992  Meckler ..................... 62/271

* cited by examiner

Primary Examiner—Melvin Jones
(74) Attorney, Agent, or Firm—Yi Li

(57) ABSTRACT

An absorption-type air conditioner system using lithium bromide solution as absorbent is provided, which has a small volume and compact structure. The system includes upper vessel 26, lower vessel 27, cooling heat exchanger 10, self-induced air circulation device 11, outdoor system controller 9 and water heater 8. Upper vessel 26 includes high temperature generator 1, low temperature generator 2 and condenser 3. The lower vessel 27 includes high temperature heat exchanger 4, low temperature heat exchanger 5, evaporator 7 and absorber 6. Upper vessel 26 is connected to lower vessel 27 by refrigerant water outlet pipe 28, LTG dilute solution inlet pipe 29, LTG concentrate solution outlet pipe 30, HTG dilute solution inlet pipe 31, HTG concentrate solution outlet pipe 32, HTG steam outlet pipe 56, heating steam switch valve 55 and HTG steam inlet pipe 57. The system is an ideal central air conditioner system for large houses.

14 Claims, 3 Drawing Sheets

ABSORPTION-TYPE AIR CONDITIONER SYSTEM

CROSS REFERENCE TO RELATED APPLICATION

This application claims priority of Chinese patent application No. 03124681.8 filed Jul. 23, 2003, which is herein incorporated by reference in its entirety.

FIELD OF TECHNOLOGY

The present invention is related to one type of air conditioner with lithium bromide solution as absorbent and with water as refrigerant. More specifically, the present invention is related to an absorption-type air conditioner system that has a small volume and a compact structure.

TECHNICAL BACKGROUND

The high temperature generator of the traditional absorption air conditioner is in an independent vessel, and the low temperature generator and the condenser are in one vessel, the evaporator and absorber are in another vessel, and the high temperature and low temperature heat exchangers are outside of these vessels. Consequently, there are many welding seams on these vessels, the probability of outward leakage is high, vacuum level is relatively low and heat loss is also relatively high.

SUMMARY OF THE INVENTION

The objective of the present invention is to provide one type of absorption air conditioner system that has a very compact structure, relatively fewer external welding seams, better vacuum condition and less heat loss.

The design scheme of the present invention is as follows: the absorption air conditioner system comprises an upper vessel, a lower vessel, a cooling heat exchanger, a self-induced air circulation device, an outdoor system controller and a water heater. The upper vessel comprises a high temperature generator (hereinafter referred to as HTG), a low temperature generator (hereinafter referred to as LTG) and a condenser. The lower vessel comprises a high temperature heat exchanger, a low temperature heat exchanger, an evaporator and an absorber. The upper vessel is connected to the lower vessel in series by a refrigerant water outlet pipe, a LTG dilute solution inlet pipe, a LTG concentrate solution outlet pipe, a HTG dilute solution inlet pipe, a HTG concentrate solution outlet pipe, a HTG steam outlet pipe, a heating steam switch valve, and a HTG steam inlet pipe. The cooling water spraying pipe of the cooling heat exchanger is connected to the condenser heat exchanger through the refrigerant water outlet pipe. The cooling heat exchanger water trough and cooling heat exchanger overflow pipe are connected to the drainpipe. The water supply ballcock valve device is connected to the water supply pipe and the water supply solenoid valve. The filter in the cooling heat exchanger is connected to the absorber heat exchange pipe of the lower vessel through the cooling water outlet pipe, cooling water pump and cooling water inlet pipe. The top end of the self-induced air circulation device is connected to absorber in the lower vessel through the air circulation pipe. The upper portion of the self-induced air circulation device is connected to the dilute solution outlet pipe of the lower vessel through a dilute solution outlet pipe, and the lower portion is connected to the dilute solution trough of the absorber in the lower vessel through a dilute solution inlet pipe. One end of the water heater exchange pipe is connected to the heating water inlet pipe II, the heating water pump and heating water inlet pipe I, and the other end of the water heater exchange pipe is connected to the heating water outlet pipe. The combustor of the water heater is connected to a water heater controller, a filter and a fuel inlet pipe of the water heater. The outdoor system controller is wired to an air conditioning water inlet temperature sensor, an air conditioning water outlet temperature sensor, a cooling water inlet temperature sensor, a cooling water outlet temperature sensor, a HTG temperature sensor, an environment temperature sensor, a HTG temperature control switch, an exhaust gas temperature sensor, a cooling water flow controller, a heating water flow controller, a HTG liquid level sensor, a refrigerant liquid level sensor, an air storage sensor, a LTG condensate sensor and a cooling water liquid level sensor.

DETAILED DESCRIPTION OF THE INVENTION

EXAMPLE

Figure 1:
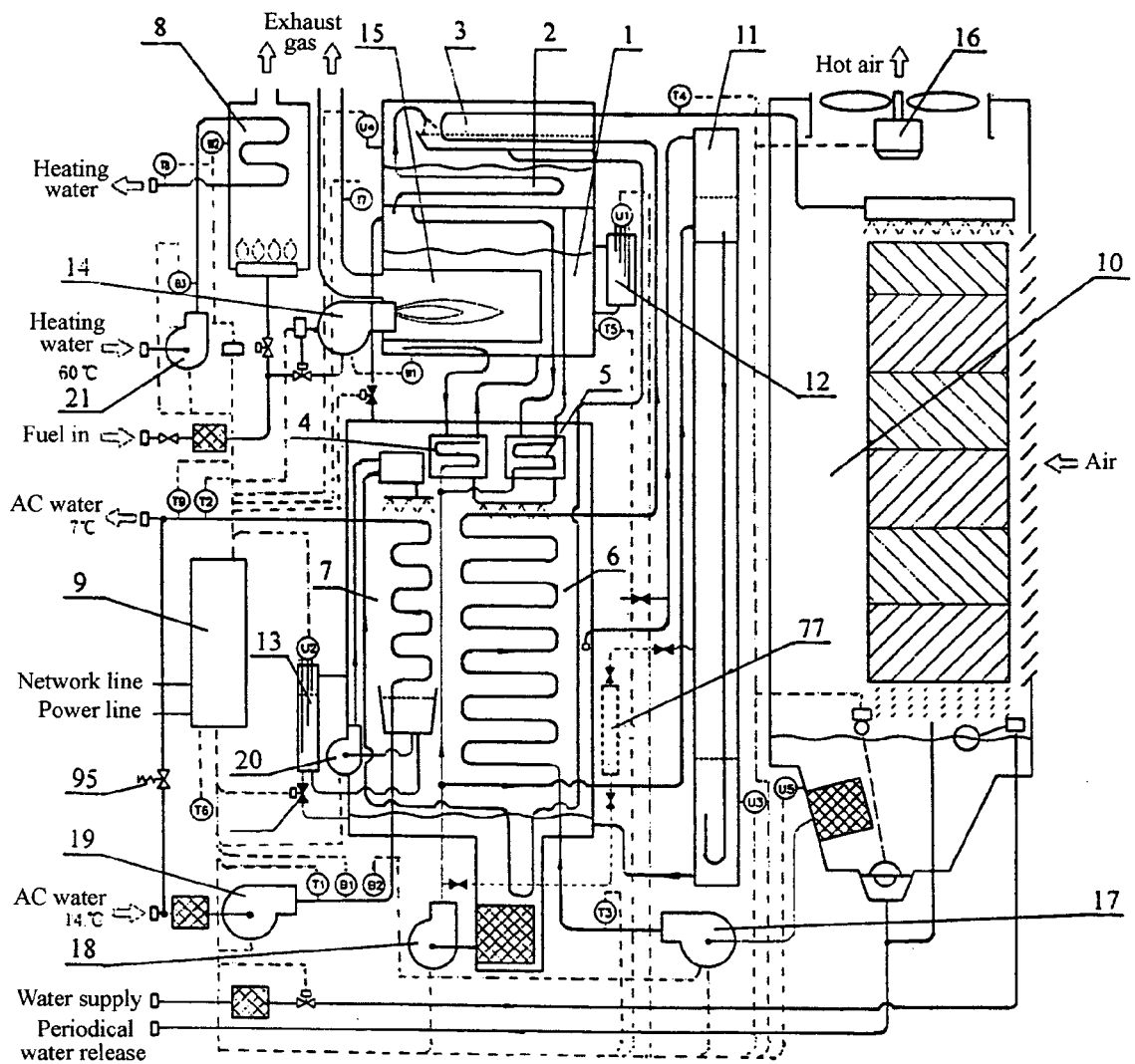
FIG. 1 is a schematic view of the structural principle of the present invention.
Figure 2:
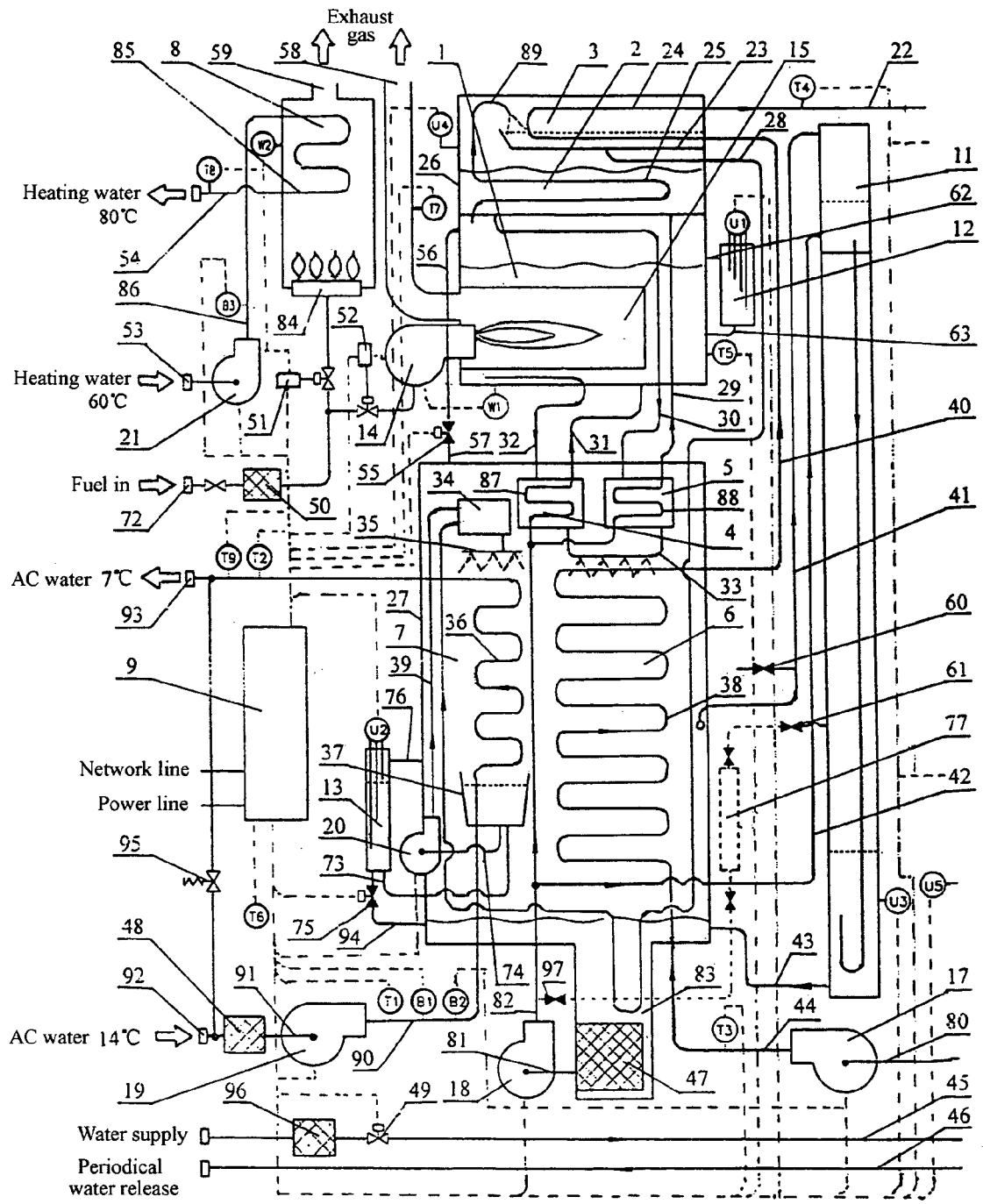
FIG. 2 is an enlarged partial view of FIG. 1.
Figure 3:
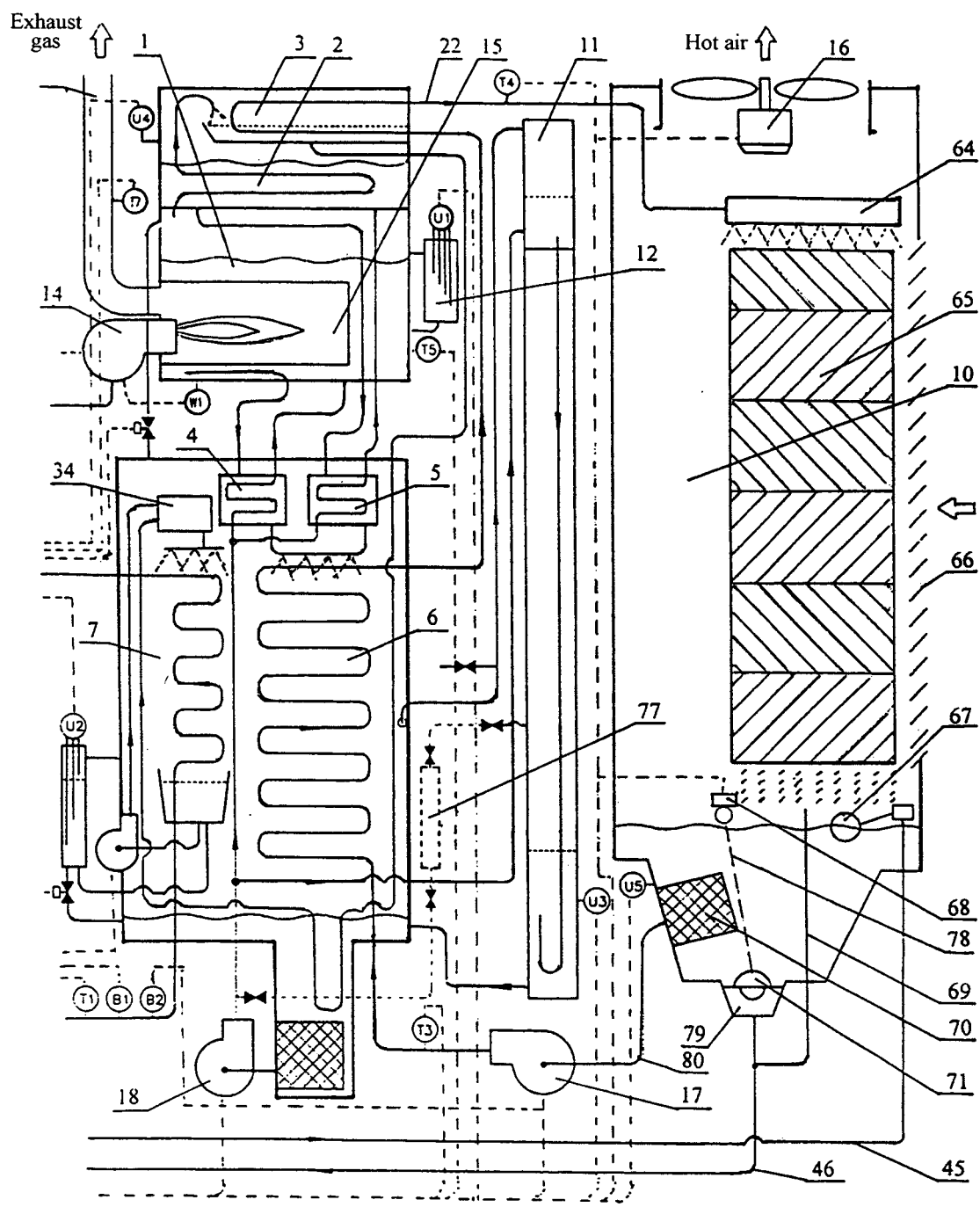
FIG. 3 is another enlarged partial view of FIG. 1.
In the above described figures the numbers represent: 1—high temperature generator (HTG), 2—low temperature generator (LTG), 3—condenser, 4—high temperature heat exchanger, 5—low temperature heat exchanger, 6—absorber, 7—evaporator, 8—water heater, 9—outdoor system controller, 10—cooling heat exchanger, 11—self-induced air circulation device, 12—HTG solution level sensing device, 13—refrigerant level sensing device, 14—combustor, 15—combustion chamber, 16—cooling fan, 17—cooling water pump, 18—solution pump, 19—air conditioning water pump, 20—refrigerant water pump, 21—heating water pump, 22—cooling water outlet pipe, 23—refrigerant water tray, 24—condenser heat exchange pipe, 25—LTG heat exchange pipe, 26—upper vessel, 27—lower vessel, 28—refrigerant water outlet pipe, 29—LTG dilute solution inlet pipe, 30—LTG concentrate solution outlet pipe, 31—HTG dilute solution inlet pipe, 32—HTG concentrate solution outlet pipe, 33—concentrate solution spraying pipe, 34—refrigerant water tank, 35—refrigerant water spraying pipe, 36—evaporator heat exchange pipe, 37—refrigerant water tray, 38—absorber heat exchange pipe, 39—refrigerant water inlet pipe, 40—cooling water pipe, 41—air circulation pipe, 42—dilute solution outlet pipe, 43—dilute solution inlet pipe, 44—cooling water inlet pipe, 45—water supply pipe, 46—drainpipe, 47—filter, 48—filter, 49—water supply solenoid valve, 50—filter, 51—water heater controller, 52—combustor controller, 53—heating water inlet pipe I, 54—heating water outlet pipe, 55—heating steam switch valve, 56—HTG steam outlet pipe, 57—HTG steam inlet pipe, 58—exhaust gas pipe, 59—exhaust gas pipe, 60—direct air circulation valve, 61—air storage chamber air circulation valve, 62—solution overflow pipe, 63—solution inlet pipe, 64—cooling water spraying pipe, 65—cooling heat exchanger filling material, 66—louvers, 67—water supply ballcock valve device, 68—drain switch, 69—overflow pipe, 70—filter, 71—drain plug, 72—fuel inlet pipe, 73—refrigerant water outlet pipe I, 74—refrigerant water outlet pipe II, 75—refrigerant bypass valve, 76—refrigerant water backflow pipe, 77—solution regenerator, 78—lifting wire, 79—cooling heat exchanger water trough, 80—cooling water outlet pipe, 81—dilute solution inlet pipe, 82—dilute solution outlet pipe, 83—dilute solution trough, 84—combustor, 85—water heater heat exchange pipe, 86—heating water inlet pipe II, 87—high temperature heat exchange pipe, 88—low temperature heat exchange pipe, 89—refrigerant HTG steam outlet pipe, 90—air-conditioning water inlet pipe I, 91—air-conditioning water inlet pipe II, 92—air-conditioning water inlet pipe III, 93—air-conditioning water outlet pipe, 94—refrigerant bypass pipe, 95—bypass valve, 96—filter, 97—solution valve, T1—air conditioning water inlet temperature sensor, T2—air-conditioning water outlet temperature sensor, T3—cooling water inlet temperature sensor, T4—cooling water outlet temperature sensor, T5—HTG temperature sensor, T6—environment temperature sensor, T7—exhaust gas temperature sensor, T8—heating water temperature sensor, T9—air-conditioning water temperature sensor, W1—HTG temperature control switch, W2—heating water temperature control switch, B1—air-conditioning water flow controller, B2—air-conditioning water flow controller, B3—heating water flow controller, U1—HTG liquid level sensor, U2—refrigerant liquid level sensor, U3—air storage sensor, U4—LTG condensate sensor, U5—cooling water liquid level sensor. Furthermore, AC water is the abbreviation of air-conditioning water.

Referring now to FIGS. 1–3, the absorption-type air conditioner system of the present invention comprises upper vessel 26, lower vessel 27, cooling heat exchanger 10, self-induced air circulation device 11, outdoor system controller 9 and water heater 8. The upper vessel 26 comprises high temperature generator (HTG) 1, low temperature generator (LTG) 2 and condenser 3. The lower vessel 27 comprises high temperature heat exchanger 4, low temperature heat exchanger 5, evaporator 7 and absorber 6. The upper vessel 26 is connected to the lower vessel 27 by refrigerant water outlet pipe 28, LTG dilute solution inlet pipe 29, LTG concentrate solution outlet pipe 30, HTG dilute solution inlet pipe 31, HTG concentrate solution outlet pipe 32, HTG steam outlet pipe 56, heating steam switch valve 55, and HTG steam inlet pipe 57. The cooling water pipe 40 connects condenser heat exchange pipe 24 of condenser 3 to absorber heat exchange pipe 38 of absorber 6.

Cooling water spraying pipe 64 of cooling heat exchanger 10 is connected to condenser heat exchange pipe 24 of condenser 3 through cooling water outlet pipe 22. The cooling heat exchanger water trough 79 and overflow pipe 69 of cooling heat exchanger 10 are connected to drainpipe 46. The water supply ballcock valve device 67 is connected to water supply pipe 45, water supply solenoid valve 49, filter 96 and the water supply. The filter 70 of cooling heat exchanger 10 is connected to absorber heat exchange pipe 38 of absorber 6 in the lower vessel 27 through cooling water outlet pipe 80, cooling water pump 17 and cooling water inlet pipe 44.

The top end of self-induced air circulation device 11 is connected to direct air circulation valve 60 and absorber 6 in lower vessel 27 through air circulation pipe 41. The upper portion of the self-induced air circulation device is connected to dilute solution outlet pipe 82 of lower vessel 27 through dilute solution outlet pipe 42, and the lower portion is connected to dilute solution trough 83 of absorber 6 in lower vessel 27 through dilute solution inlet pipe 43.

One end of water heater heat exchange pipe 85 of water heater 8 is connected to heating water inlet pipe II 86, heating water pump 21 and heating water inlet pipe I 53, and the other end is connected to heating water outlet pipe 54. Combustor 84 of water heater 8 is connected to water heater controller 51, filter 50 and fuel inlet pipe 72. Fuel inlet pipe 72 is also connected to combustor 14 through combustor controller 52.

Outdoor system controller 9 is connected by connecting wires to air-conditioning water inlet temperature sensor T1, air-conditioning water outlet temperature sensor T2, cooling water inlet temperature sensor T3, cooling water outlet temperature sensor T4, HTG temperature sensor T5, environment temperature sensor T6, exhaust gas temperature sensor T7, heating water temperature sensor T8, cooling water temperature sensor T9, HTG temperature control switch W1, heating water temperature control switch W2, air-conditioning water flow controller B1, air-conditioning water flow controller B2, heating water flow controller B3, HTG liquid level sensor U1, refrigerant liquid level sensor U2, air storage sensor U3, LTG condensate sensor U4 and cooling water liquid level sensor U5.

Now referring to FIGS. 1 and 2, combustor 14 of HTG 1 is connected to combustor controller 52, filter 50 and fuel inlet pipe 72. HTG concentrate solution outlet pipe 32 is connected to high temperature heat exchanger 4, and HTG dilute solution inlet pipe 31 is connected to high temperature heat exchange pipe 87. The refrigerant steam of HTG 1, passing LTG heat exchange pipe 25 of LTG 2, exits from refrigerant HTG steam outlet pipe 89 of condenser 3.

Referring to FIGS. 1 and 2, LTG dilute solution inlet pipe 29 of LTG 2 is connected to low temperature heat exchange pipe 88 of low temperature heat exchanger 5, and LTG concentrate solution outlet pipe 30 is connected to low temperature heat exchanger 5.

Referring to FIGS. 1 and 2, refrigerant water tray 23 of condenser 3 is connected to refrigerant water tank 34 of evaporator 7 through refrigerant water outlet pipe 28. One end of condenser heat exchange pipe 24 of condenser 3 is connected to absorber heat exchange pipe 38 of absorber 6 through cooling water pipe 40, and the other end is connected to cooling water outlet pipe 22.

Referring to FIGS. 1 and 2, solution overflow pipe 62 and solution inlet pipe 63 of HTG solution level sensing device 12 are connected to HTG 1. Solution overflow pipe 62 is slightly above the surface of the solution, and solution inlet pipe 63 is located at lower middle portion of the solution.

Referring to FIGS. 1 and 2, the two ends of concentrate solution spraying pipe 33 of absorber 6 are connected to high temperature heat exchanger 4 and low temperature heat exchanger 5, respectively. One end of high temperature heat exchange pipe 87 of high temperature heat exchanger 4 and one end of low temperature heat exchange pipe 88 of low temperature heat exchanger 5 are connected to solution pump 18, dilute solution inlet pipe 81, filter 47 and dilute solution trough 83 through dilute solution outlet pipe 82.

Referring to FIGS. 1 and 2, one end of evaporator heat exchange pipe 36 of evaporator 7 is connected to air-conditioning water inlet pipe I 90, air-conditioning water pump 19, air-conditioning water inlet pipe II 91, filter 48 and air-conditioning water inlet pipe III 92, and the other end is connected to air-conditioning water outlet pipe 93.

Referring to FIGS. 1 and 2, in one aspect, refrigerant water tray 37 is connected to refrigerant water tank 34 through refrigerant water outlet pipe II 74, refrigerant water pump 20 and refrigerant water inlet pipe 39; in another aspect, refrigerant water tray 37 is also connected to the interior of lower vessel 27 through refrigerant water outlet pipe I 73, refrigerant level sensing device 13 and refrigerant water backflow pipe 76. The lower end of refrigerant level sensing device 13 is connected to dilute solution trough 83 through refrigerant bypass valve 75 and refrigerant bypass pipe 94.

Referring to FIGS. 1 and 2, the two ends of bypass valve 95 are connected to air-conditioning water inlet pipe III 92 and air-conditioning water outlet pipe 93, respectively.

Referring to FIGS. 1 and 2, one end of solution regenerator 77 is connected to self-induced air circulation device 11 through air storage chamber air circulation valve 61, and the other end is connected to dilute solution outlet pipe 82 through solution valve 97.

The operating process the air conditioner system of the present invention is as follows:

HTG 1: Combustor 14 of HTG 1 creates combustion in combustion chamber 15, the blaze of 1200° C. heats the solution to 158° C., which produces a large amount of water steam, and the water steam enters LTG heat exchange pipe 25 of LTG 2. The HTG 1 condenses 57% dilute solution to 63%, which enters high temperature heat exchanger 4 through HTG concentrate solution outlet pipe 32 and sprays towards absorber heat exchange pipe 38 from concentrate solution spraying pipe 33.

LTG 2: The water steam from HTG 1 enters LTG heat exchange pipe 25, and heats the dilute solution outside LTG heat exchange pipe 25 to 90° C. The water steam generated by the dilute solution enters condenser 3 through refrigerant HTG steam outlet pipe 89. 57% solution is condensed to 63%, which enters low temperature heat exchanger 5 through LTG concentrate solution outlet pipe 30, and sprays towards absorber heat exchange pipe 38 from concentrate solution spraying pipe 33.

Condenser 3: The cooling water flows through condenser heat exchange pipe 24 and thereby condenses the water steam outside the pipe into water, and carries the heat from LTG 2 into cooling heat exchanger 10 through cooling water outlet pipe 22. As a refrigerant, the condensed water enters refrigerant water tank 34 of evaporator 7 through refrigerant water outlet pipe 28, and sprays towards evaporator heat exchange pipe 36 through refrigerant water spraying pipe 35, hence to provide cooling effect.

High Temperature Heat Exchanger 4: Facilitate the heat exchange between the 158° C. concentrate solution coming from HTG 1 through HTG concentrate solution outlet pipe 32 and the 38° C. dilute solution from absorber 6 through dilute solution trough 83, filter 47, dilute solution inlet pipe 81, solution pump 18 and dilute solution outlet pipe 82, thereby the temperature of the dilute solution is raised, and the temperature of the concentrate solution is reduced. After the heat exchange, the 158° C. concentrate solution becomes 42° C. as it enters absorber 6, hence the released heat energy from the 116° C. temperature variation is recovered.

Low Temperature Heat Exchanger 5: Facilitate the heat exchange between the 90° C. concentrate solution coming from LTG 2 through LTG concentrate solution outlet pipe 30 and the 38° C. dilute solution from absorber 6 through dilute solution trough 83, filter 47, dilute solution inlet pipe 81, solution pump 18 and dilute solution outlet pipe 82. After the heat exchange, the 90° C. concentrate solution becomes 41° C. as it enters absorber 6, hence the released heat energy from a 49° C. temperature variation is recovered. The high temperature heat exchanger 4 and the low temperature heat exchanger 5 have substantially reduced the heat energy required in the heating process of HTG 1 and LTG 2; at the same time, have reduced the cooling water's work load required for reducing temperature of the solution. The efficiency of the high temperature heat exchanger 4 and the low temperature heat exchanger 5 determines the energy-saving performance of the system.

Evaporator 7: The 14° C. air-conditioning water coming from an external air-conditioning heat exchanger through air-conditioning water inlet pipe III 92, filter 48, air-conditioning water inlet pipe II 91 and air conditioning water pump 19 is cooled down to 7° C. through evaporator heat exchange pipe 36 by the spraying and evaporation of the 4° C. refrigerant water under vacuum condition outside evaporator heat exchange pipe 36. The refrigerant water absorbs the heat energy carried by the air-conditioning water from the external air-conditioning heat exchanger, and converts to water steam, and then enters absorber 6.

Absorber 6: The 41° C. and 63% lithium bromide solution has a very strong capacity in absorbing water steam. When it sprays to absorber heat exchange pipe 38 from concentrate solution spraying pipe 33, it absorbs the water steam in evaporator 7, thereby having its temperature raised and being diluted in concentration, is then stored in dilute solution trough 83. The cooling water from cooling heat exchanger 10, passing through filter 70, cooling water outlet pipe 80, cooling water pump 17 and cooling water inlet pipe 44, and entering absorber heat exchange pipe 38, carries away the heat energy absorbed by the lithium bromide solution. While the solution is diluted to 57%, and is delivered by solution pump 18 through dilute solution outlet pipe 82 to high temperature heat exchange pipe 87 and low temperature heat exchange pipe 88 of high temperature heat exchanger 4 and low temperature heat exchanger 5, respectively, to be heated and condensed.

The advantages of the present invention are as follows:

LEIt is a breakthrough of the structure of the traditional absorption-type air conditioner. The condenser 3, LTG 2 and HTG 1 are in one vessel. Above the HTG 1 is LTG 2, and above LTG 2 is condenser 3. This structure substantially reduces outward leakage. The upper vessel 24 has only one long welding seam, therefore it has a superior vacuum condition and a compact structure. There is a proper heat exchange gradient between the high temperature generator and the low temperature generator. The temperature in HTG 1 is the highest, the temperature in LTG 2 is in the middle, and the temperature in condenser 3 is the lowest. Both high temperature heat exchanger 4 and low temperature heat exchanger 5 are located in lower vessel 27; and the four pipes for the concentrate solution entering into and the dilute solution exiting from absorber 6 are all within lower vessel 27. Even if there is a small amount of leakage, it will not affect the vacuum level of the whole system. Upper vessel 26 and lower vessel 27 have fewer welding seams, which can meet the requirement of the high level vacuum.

Because of its compact structure, small volume, few welding seams, high vacuum, and highly automated control, the air conditioner system of the present invention is an ideal central air conditioning system for large houses and mansions.

I claim:

1. An absorption-type air conditioner system characterized in that the absorption-type air conditioner system comprises an upper vessel (26), a lower vessel (27), a cooling heat exchanger (10), a self-induced air circulation device (11), an outdoor system controller (9) and a water heater (8); the upper vessel (26) comprises a HTG (1), a LTG (2) and a condenser (3); and the lower vessel (27) comprises a high temperature heat exchanger (4), a low temperature heat exchanger (5), an evaporator (7) and an absorber (6); the upper vessel (26) is connected to the lower vessel (27), by a refrigerant water outlet pipe (28), a LTG dilute solution inlet pipe (29), a LTG concentrate solution outlet pipe (30), a HTG dilute solution inlet pipe (31), a HTG concentrate solution outlet pipe (32), a HTG steam outlet pipe (56), a heating steam switch valve (55), and a HTG steam inlet pipe (57); a cooling water pipe (40) connects a condenser heat exchange pipe (24) of the condenser (3) to an absorber heat exchange pipe (38) of the absorber (6).

2. The absorption-type air conditioner system according to claim 1 characterized in that a cooling water spraying pipe (64) of the cooling heat exchanger (10) is connected to the condenser heat exchange pipe (24) of the condenser (3) through a cooling water outlet pipe (22); a cooling heat exchanger water trough (79) and an overflow pipe (69) of the cooling heat exchanger (10) are connected to a drainpipe (46); a water supply ballcock valve device (67) is connected to a water supply pipe (45), a water supply solenoid valve (49), a filter (96) and a water supply; a filter (70) of the cooling heat exchanger (10) is connected to the absorber heat exchange pipe (38) of the absorber (6) in the lower vessel (27) through a cooling water outlet pipe (80), a cooling water pump (17) and a cooling water inlet pipe (44).

3. The absorption-type air conditioner system according to claim 1 characterized in that a top end of the self-induced air circulation device (11) is connected to a direct air circulation valve (60) and the absorber (6) of the lower vessel (27) through an air circulation pipe (41); and an upper portion of the self-induced air circulation device (11) is connected to a dilute solution outlet pipe (82) of the lower vessel (27) through a dilute solution outlet pipe (42), and a lower portion of the self-induced air circulation device (11) is connected to a dilute solution trough (83) of the absorber (6) of the lower vessel (27) through a dilute solution inlet pipe (43).

4. The absorption-type air conditioner system according to claim 1 characterized in that one end of a water heater heat exchange pipe (85) of the water heater (8) is connected to a heating water inlet pipe II (86), a heating water pump (21) and a heating water inlet pipe I (53), and an other end of the water heater heat exchange pipe (85) is connected to a heating water outlet pipe (54); a combustor (84) of the water heater (8) is connected to a water heater controller (51), a filter (50) and a fuel inlet pipe (72), and is also connected to a combustor (14) through a combustor controller (52).

5. The absorption-type air conditioner system according to claim 1 characterized in that the outdoor system controller (9) is wired to an air-conditioning water inlet temperature sensor (T1), an air-conditioning water outlet temperature sensor (T2), a cooling water inlet temperature sensor (T3), a cooling water outlet temperature sensor (T4), a HTG temperature sensor (T5), an environment temperature sensor (T6), an exhaust gas temperature sensor (T7), a heating water temperature sensor (T8), a cooling water temperature sensor (T9), a HTG temperature control switch (W1), a heating water temperature control switch (W2), an air-conditioning water flow controller (B1), an air-conditioning water flow controller (B2), a heating water flow controller (B3), a HTG liquid level sensor (U1), a refrigerant liquid level sensor (U2), an air storage sensor (U3), a LTG condensate sensor (U4) and a cooling water liquid level sensor (U5).

6. The absorption-type air conditioner system according to claim 1 characterized in that a combustor (14) of the HTG (1) is connected to a combustor controller (52), a filter (50) and a fuel inlet pipe (72); the HTG concentrate solution outlet pipe (32) is connected to the high temperature heat exchanger (4); the HTG dilute solution inlet pipe (31) is connected to a high temperature heat exchange pipe (87); and a refrigerant steam of the HTG (1), passing a LTG heat exchange pipe (25) of the LTG (2), exits from a refrigerant HTG steam outlet pipe (89) of the condenser (3).

7. The absorption-type air conditioner system according to claim 1 characterized in that the LTG dilute solution inlet pipe (29) of the LTG (2) is connected to a low temperature heat exchange pipe (88) of the low temperature heat exchanger (5); and the LTG concentrate solution outlet pipe (30) is connected to the low temperature heat exchanger (5).

8. The absorption-type air conditioner system according to claim 1 characterized in that a refrigerant water tray (23) of the condenser (3) is connected to a refrigerant water tank (34) of the evaporator (7) through the refrigerant water outlet pipe (28); and one end of the condenser heat exchange pipe (24) of the condenser (3) is connected to the absorber heat exchange pipe (38) of the absorber (6) through the cooling water pipe (40).

9. The absorption-type air conditioner system according to claim 1 characterized in that a solution overflow pipe (62) and a solution inlet pipe (63) of a HTG solution level sensing device (12) are connected to the HTG (1); the solution overflow pipe (62) is slightly above a surface of a solution, and the solution inlet pipe (63) is located at a lower middle portion of the solution.

10. The absorption-type air conditioner system according to claim 1 characterized in that two ends of a concentrate solution spraying pipe (33) of the absorber (6) are connected to the high temperature heat exchanger (4), and the low temperature heat exchanger (5), respectively; one end of a high temperature heat exchange pipe (87) of the high temperature heat exchanger (4) and one end of a low temperature heat exchange pipe (88) of the low temperature heat exchanger (5) are connected to a solution pump (18), a dilute solution inlet pipe (81), a filter (47) and a dilute solution trough (83) through a dilute solution outlet pipe (82).

11. The absorption-type air conditioner system according to claim 1 characterized in that one end of an evaporator heat exchange pipe (36) of the evaporator (7) is connected to an air-conditioning water inlet pipe I (90), an air conditioning water pump (19), an air-conditioning water inlet pipe II (91), a filter (48) and an air-conditioning water inlet pipe III (92); and an other end of the evaporator heat exchange pipe (36) is connected to an air-conditioning water outlet pipe (93).

12. The absorption-type air conditioner system according to claim 1 characterized in that a refrigerant water tray (37) is connected to a refrigerant water tank (34) through a refrigerant water outlet pipe II (74), a refrigerant water pump (20) and a refrigerant water inlet pipe (39); the refrigerant water tray (37) is also connected to the interior of the lower vessel (27) through a refrigerant water outlet pipe I (73), a refrigerant level sensing device (13) and a refrigerant water backflow pipe (76); a lower end of the refrigerant level sensing device (13) is connected to a dilute solution trough (83) through a refrigerant bypass valve (75) and a refrigerant bypass pipe (94).

13. The absorption-type air conditioner system according to claim 1 characterized in that two ends of a bypass valve (95) are connected to an air-conditioning water inlet pipe III (92) and an air-conditioning water outlet pipe (93), respectively.

14. The absorption-type air conditioner system according to claim 1 characterized in that one end of a solution regenerator (77) is connected to the self-induced air circulation device (11) through an air storage chamber air circulation valve (61), and an other end of the solution regenerator (77) is connected to a dilute solution outlet pipe (82) through a solution valve (97).

* * * * *